Feb. 27, 1945.　　　H. W. DIETERT　　　2,370,293
COMBUSTION TUBE ASSEMBLY
Filed June 7, 1943
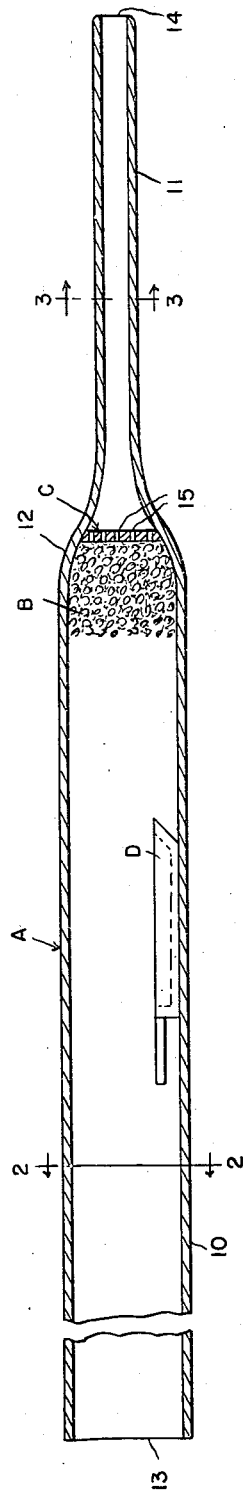
FIG.3.
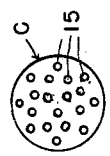
FIG.4.
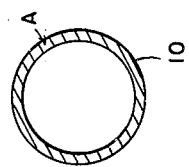
FIG.2.
*INVENTOR.*
HARRY W. DIETERT
BY
ATTORNEYS Patented Feb. 27, 1945

2,370,293

UNITED STATES PATENT OFFICE 2,370,293

COMBUSTION TUBE ASSEMBLY

Harry W. Dietert, Detroit, Mich.

Application June 7, 1943, Serial No. 490,000

6 Claims. (Cl. 23—292)

This invention relates generally to combustion tube assemblies and refers more particularly to ceramic combustion tube assemblies adapted for use in sulphur determinators or apparatus for determining by the sulphur combustion method how much sulphur is contained in samples of coal, coke, grease, alloy steels and other ferrous and nonferrous materials.

One of the essential objects of the invention is to provide an assembly of the type mentioned wherein sulphur in such samples may be burned to produce sulphur dioxide or sulphur trioxide fumes or gases for tests or analysis purposes.

Another object is to provide an assembly containing a dust trap which, when heated, is capable of catching dust and iron oxide, thus preventing dust collecting in the exit end of the combustion tube which would cause condensation of the sulphur gases such as sulphur dioxide or sulphur trioxide.

Another object is to provide an assembly wherein the dust trap includes a packing material which may be easily inserted, removed and replaced whenever desired.

Another object is to provide an assembly wherein the packing material of the dust trap includes (1) a fired, crushed or granular ceramic material or grog such as sillimanite, mullite or other suitable filtering material having a substantially constant volume at elevated temperatures, and (2) a glazing material such as borax, sulphur-free clay, bentonite or other suitable binder materials or glazes having low melting points. Both the grog and the glazing material must be non-absorbents of sulphur.

Another object is to provide an assembly wherein the packing material becomes a sticky and viscous mass when heated so that the particles or grains of the grog may be held together by the glazing material in a predetermined position within the combustion tube. Thus, the glazing material not only serves as a binder and imparts a bond to the loose particles or grains of the grog, but also assures compactness thereof by transforming such loose material into a workable mass which will be inert, stable and free from shrinkage at elevated temperatures.

Another object is to provide an assembly wherein the combustion tube contains an element, preferably in the form of a perforated disc, that not only serves as an abutment for the workable mass and thereby determines the position of such mass within the tube but permits the filtered sulphur fumes and gases discharged from the mass to pass on through the outlet end of the tube to a titration vessel or other suitable part (not shown) of the determinator.

Another object is to provide an assembly wherein the combustion tube has a single restriction which alone is operable as an abutment for the workable mass in the event the perforated disc aforesaid is omitted, and is operable as an abutment for the perforated disc when it is used.

Another object is to provide an assembly that is simple in construction, economical to manufacture, easy to install and efficient in operation.

Other objects, advantages and novel details of construction of this invention will be made more apparent as this description proceeds, especially when considered in connection with the accompanying drawing, wherein:

Figure 1 is a longitudinal vertical sectional view through a combustion tube assembly embodying my invention, and showing at the proper position within the tube a boat loaded with a sample containing sulphur to be burned;

Figure 2 is a cross sectional view taken substantially on the line 2—2 of Figure 1;

Figure 3 is a cross sectional view taken substantially on the line 3—3 of Figure 1;

Figure 4 is a detail view of the perforated disc

Referring now to the drawing, A is the combustion tube, B is the dust trap, and C is the perforated disc of an assembly embodying my invention.

As shown, the combustion tube A is formed of suitable ceramic material and has two cylindrical portions 10 and 11 respectively of different cross sectional area arranged end to end and provided at the juncture thereof with a substantially frusto-conical portion 12. The cylindrical portion 10 may be considered as the main body of the tube and has an open end 13 which is the inlet of the tube. The cylindrical portion 11 is much smaller than the cylindrical portion 10 and has an open end 14 which is the outlet of the tube. The frusto-conical portion 12 is between and merges into the adjacent ends of the cylindrical portions 10 and 11. Thus, the tube A has only one restriction 12 and this constitutes an abutment for the apertured disc C and dust trap B. Various ceramic materials such as zircon, alundum, quartz, clay and porcelain may be employed in the construction of the tube A, and the size and dimensions thereof may also be varied as desired.

The dust trap B is located within the body 10 of the tube at the inner restricted end thereof and comprises a workable mass of packing material having sticky and viscous characteristics.

Preferably the packing material includes a fired, crushed or granular ceramic material or grog and a glazing material. The grog may be formed of sillimanite, mullite or other filtering material having a substantially constant volume at elevated temperatures, while the glazing material may be formed of borax, sulphur-free clay, bentonite or other binder materials or glazes having low melting points. Such workable mass may be used alone or in combination with the perforated disc C as desired.

The perforated disc C is also formed of ceramic material and serves as an abutment for the workable mass B. The perforations 15 in the disc are relatively small but collectively provide adequate passage for the sulphur fumes or gases from the mass B to the outlet 14 on the tube.

To assemble the parts, the combustion tube A is disposed in substantially a horizontal position within a combustion furnace (not shown). The perforated disc C is inserted into the body portion 10 of the tube and is then pushed lengthwise thereof into abutting relation with the frusto-conical portion 12. The grog and glazing material in suitable quantities, preferably aggregating 10 grams at a ratio by weight of 1 part glazing material to 10 parts grog, are introduced into the combustion tube by placing such material into conventional boats such as D and dumping the same to form a pile of such materials substantially midway the ends of the body 10 of the tube. Here such materials are heated sufficiently to melt the glazing material so that it will transform the loose grog into a workable mass having sticky and viscous characteristics. Thus, the glazing material will impart a bond to the grains or particles of the grog to hold them in assembled relation to each other. The mass is then pushed into abutting relation with the perforated disc C and frusto-conical portion 12 to provide a filtering body or packing against the cylindrical wall of the combustion tube. When the disc C is not used the mass is pushed into abutting relation with the frusto-conical portion 12 of the tube. Regardless of whether the disc C is used, the glazing material will hold the grog in proper operative filtering position relative to the interior of the tube.

In use, the samples such as metal, coal, coke, grease, etc. to be analyzed may be placed in individual boats such as D, which in turn are inserted one at a time into the body 10 of the combustion tube, preferably to a point substantially midway the ends of the body portion 10 as illustrated in Figure 1. An oxygen tube (not shown) is then connected to the inlet 13 of the combustion tube. Then the furnace containing the combustion tube is operated so that the sulphur in the sample will be burned to produce sulphur fumes or gases to be filtered by the mass B. When heated to a dull red this mass catches dust and iron oxide. This prevents any collection of metallic dust in the exit end of the combustion tube or in the entrance tubing of the sulphur determinator. Such dust if present in these parts at low temperature will cause chemical changes in the sulphur fumes and cause condensation of these fumes in the forementioned parts. The result would be an inaccurate sulphur determination in that all of the sulphur fumes would not enter the sulphur determinator.

The glazing type of bond in the filter material makes for a dust-free filter. Other types of binders are dusty at elevated temperatures. A dust-free filter will prevent any dust being blown into the exit end of the combustion tube.

What I claim as my invention is:

1. A refractory combustion tube having a large diameter portion forming the combustion chamber, a portion of smaller diameter with a shoulder between said portions, and a filter located adjacent to said shoulder formed of granular material and a glazing surface coating and binder for said material having so low a fusing point as to become sticky at the operating temperature of the tube.

2. A combustion tube assembly comprising a combustion tube, and an inert dust trap within the tube, said dust trap including a mass of filtering material and a glazing material, the glazing material having so low a fusing point as to become sticky at operating temperatures of the tube.

3. A combustion tube assembly comprising a combustion tube, and an inert dust trap within the tube, said dust trap including a mass of filtering material and a glazing material, the glazing material having so low a fusing point as to become sticky at operating temperatures of the tube, said mass of filtering material being free from shrinkage at elevated temperatures.

4. A combustion tube assembly comprising a combustion tube and a filter, said filter being formed of a mixture of granular material and a glazing material and being replaceable, said tube having an entrance portion and an exit portion, said filter being located between said portions, the glazing material having so low a fusing point as to become sticky at operating temperatures of the tube, whereby dust is prevented from collecting in the exit end of the tube.

5. A combustion tube assembly comprising a combustion tube and a filter, said filter being formed of a mixture of granular material and a glazing material and being replaceable, said tube having an entrance portion and an exit portion, said filter being located between said portions, the glazing material having so low a fusing point as to become sticky at operating temperatures of the tube, whereby dust and oxides are prevented from collecting in the exit end of the tube, and an abutment plate for said filter located within said tube and having one or more passages therein for filtered gases.

6. A combustion tube assembly comprising a combustion tube, and an inert dust trap within the tube, said dust trap including a mass of filtering material and a glazing material, the glazing material having so low a fusing point as to become sticky at operating temperatures of the tube, said combustion tube being made of ceramic material and said filtering material being made of granular ceramic material.

HARRY W. DIETERT.